Figure 1:
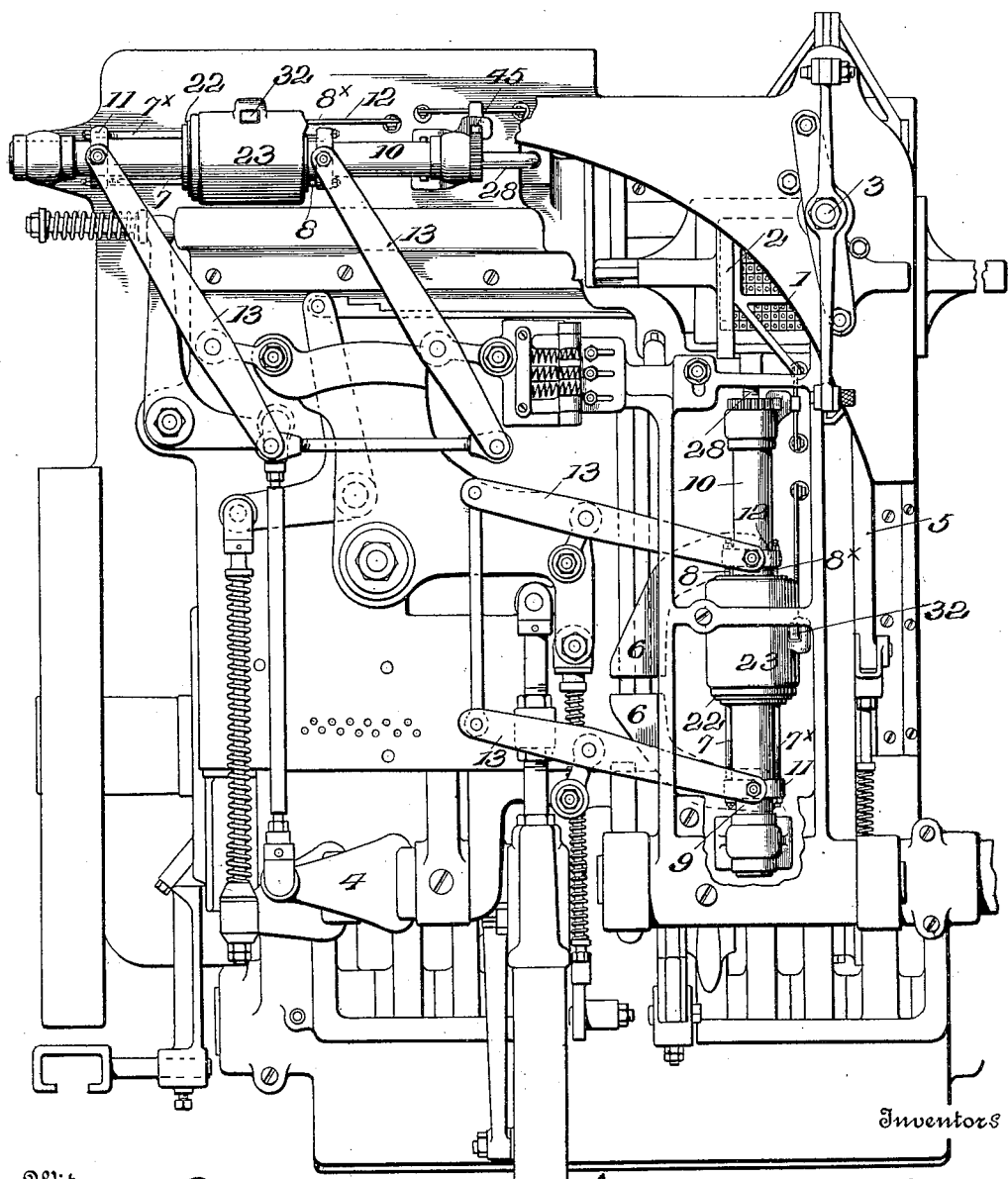

J. S. BANCROFT & M. C. INDAHL.
CENTERING OR ADJUSTING MECHANISM FOR TYPE MACHINES.
APPLICATION FILED DEC. 23, 1912.

1,094,626.

Patented Apr. 28, 1914.

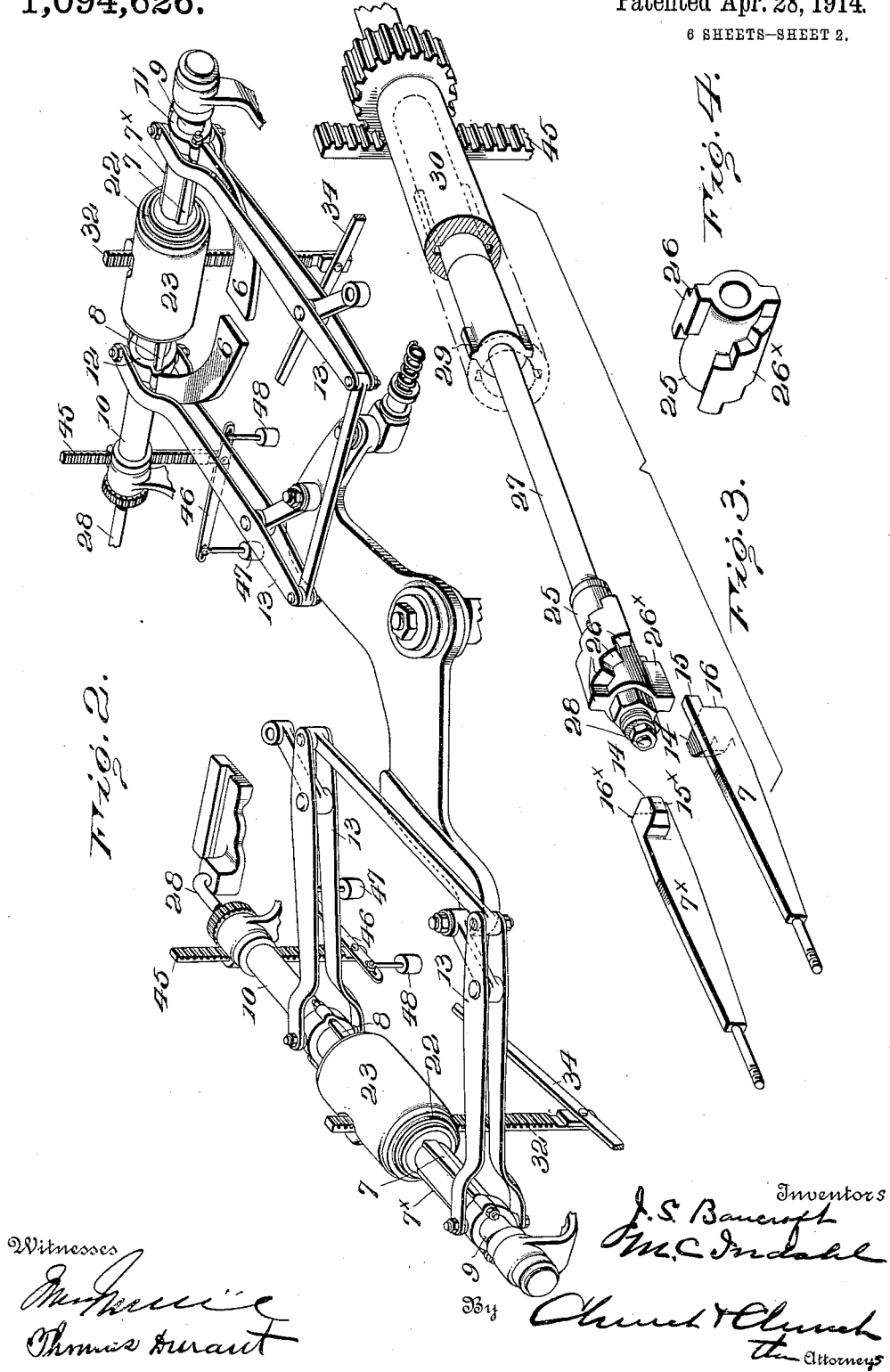

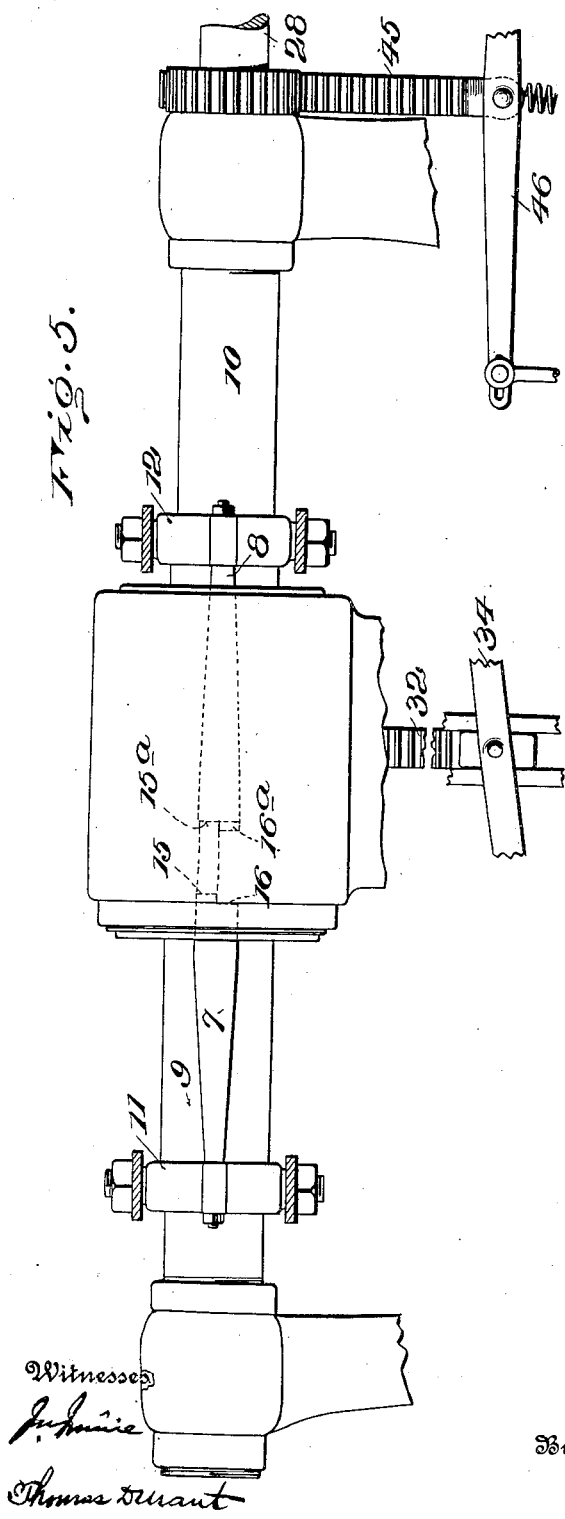
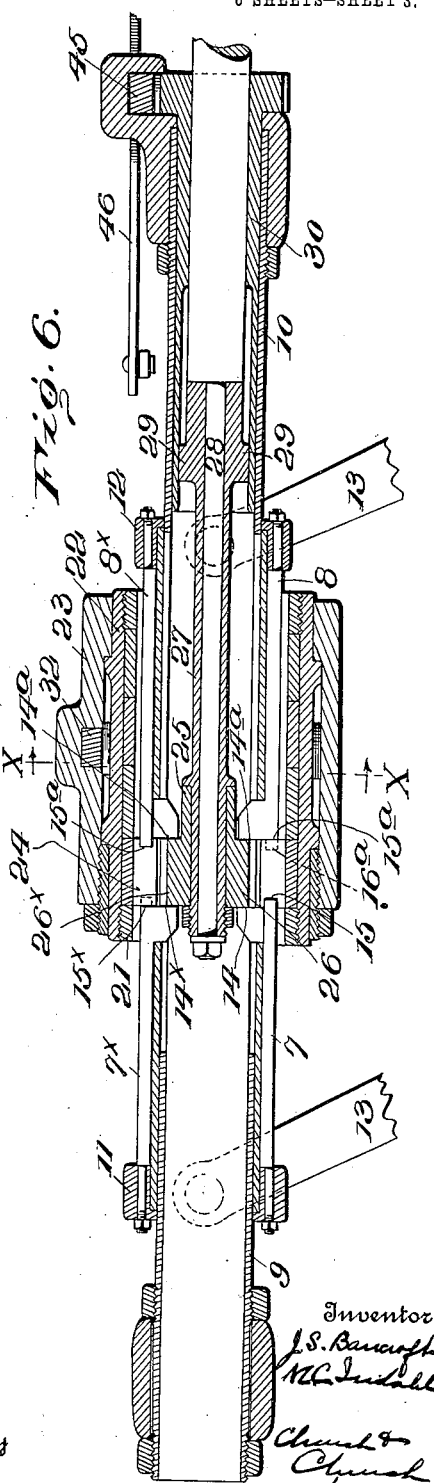

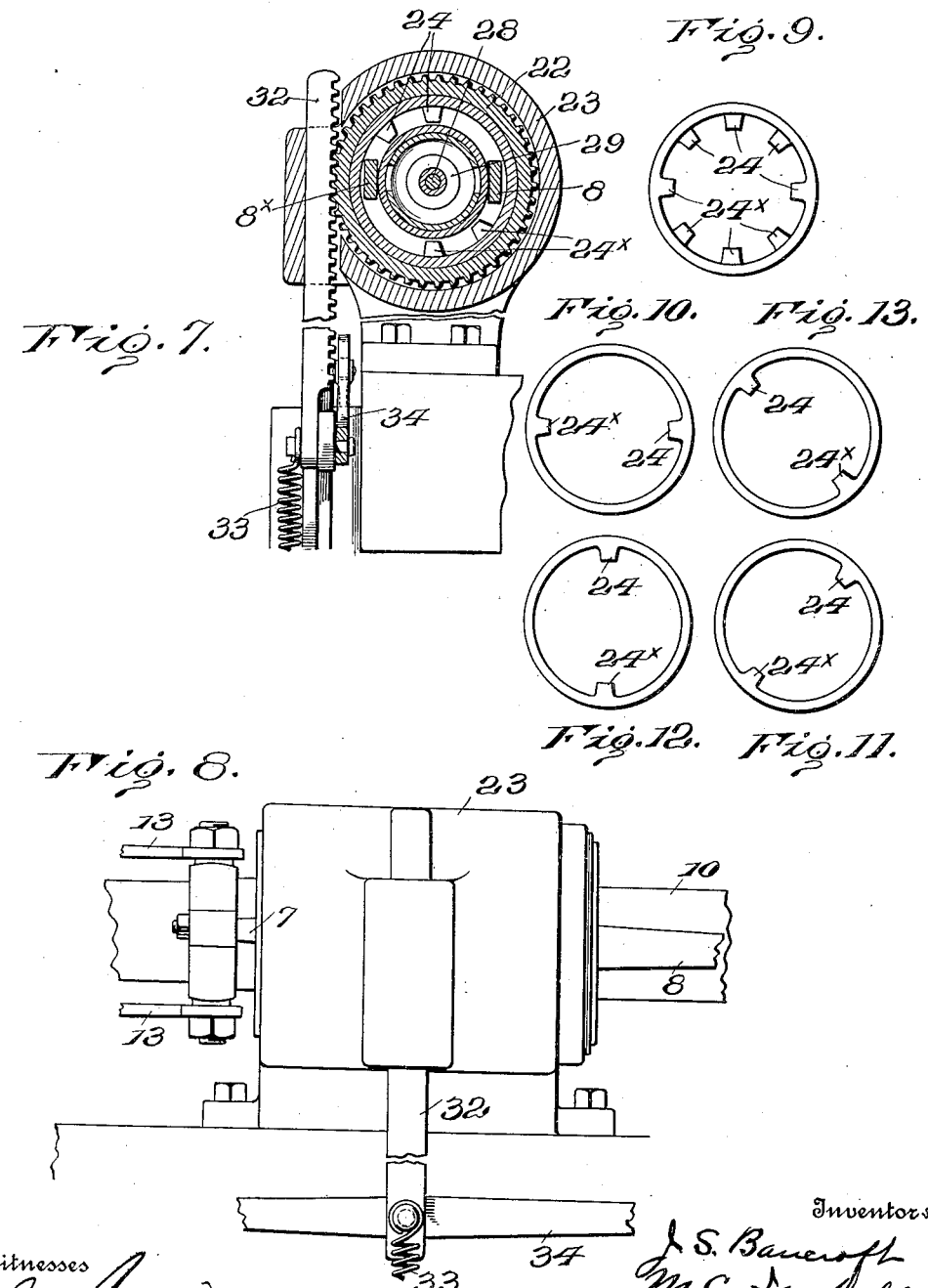

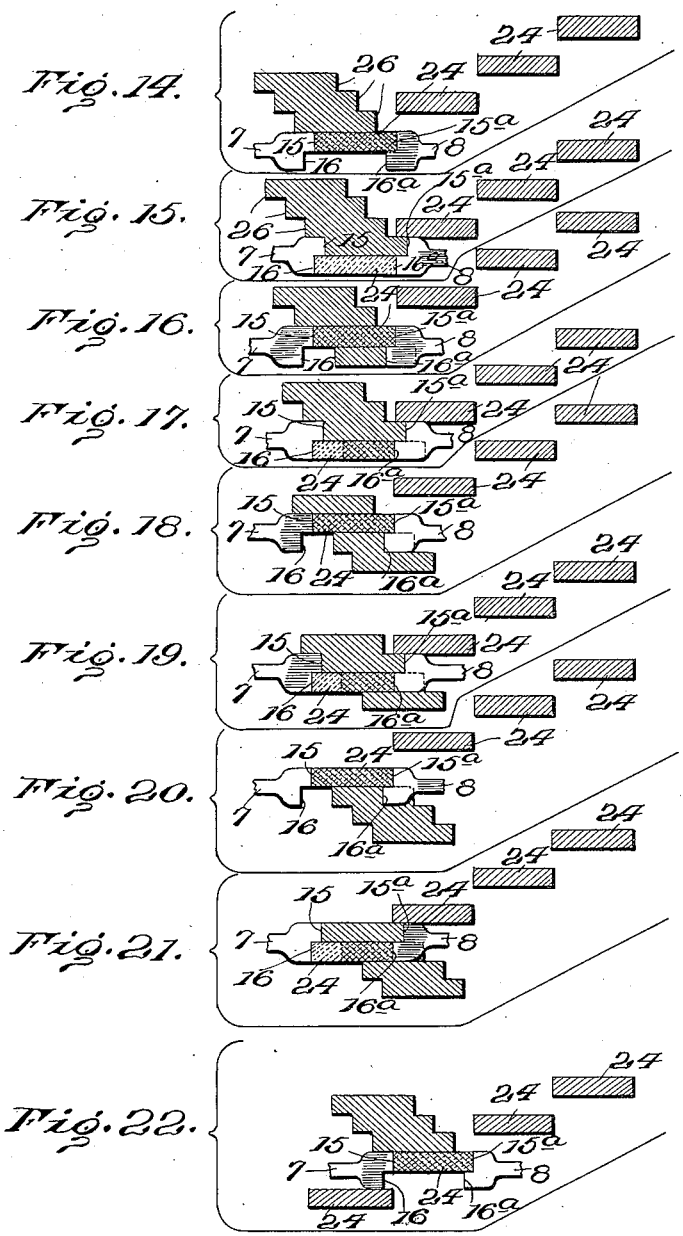

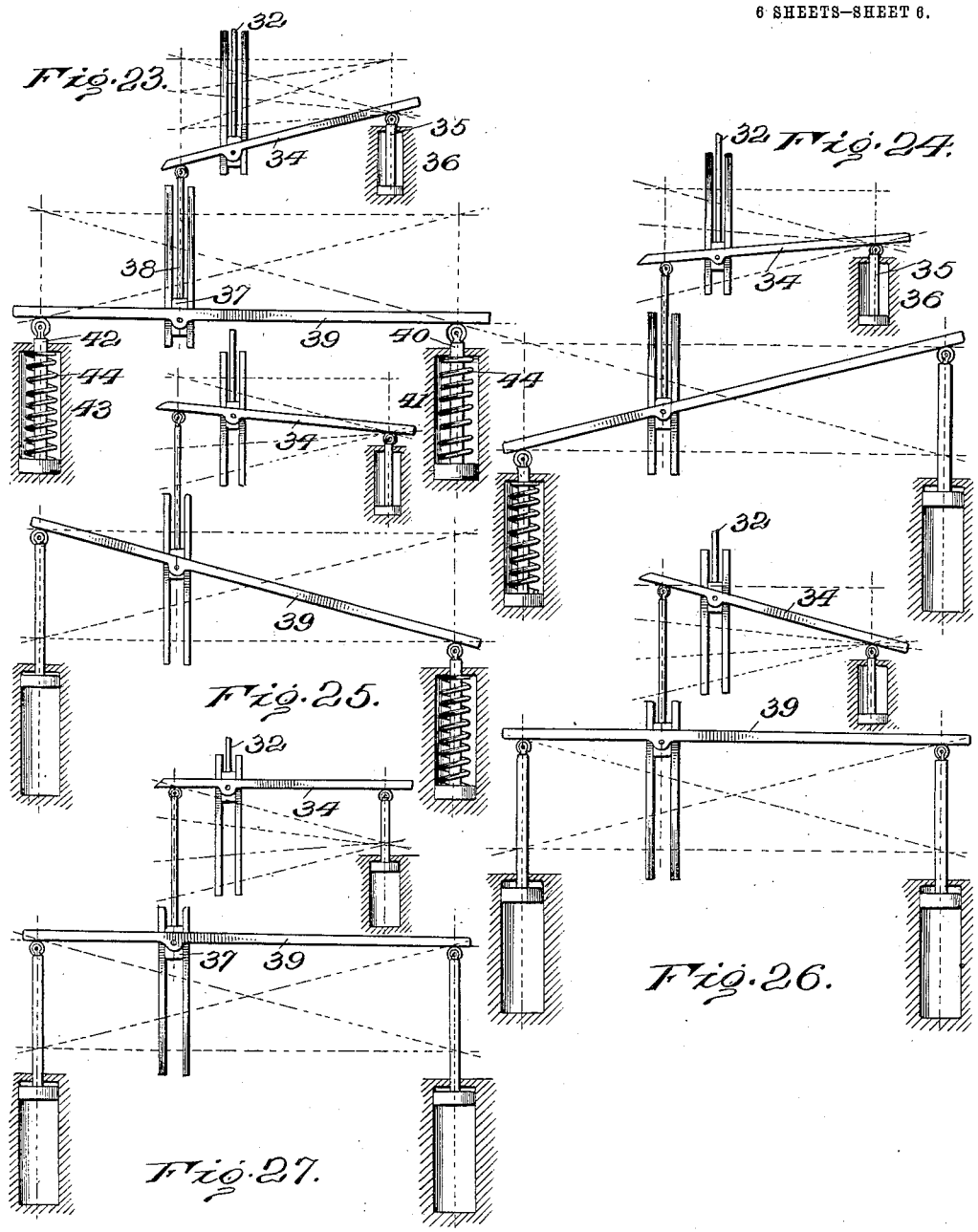

UNITED STATES PATENT OFFICE.

JOHN SELLERS BANCROFT AND MAURITZ C. INDAHL, OF PHILADELPHIA, PENNSYLVANIA, ASSIGNORS TO LANSTON MONOTYPE MACHINE COMPANY, OF PHILADELPHIA, PENNSYLVANIA, A CORPORATION OF VIRGINIA.

CENTERING OR ADJUSTING MECHANISM FOR TYPE-MACHINES.

1,094,626.  Specification of Letters Patent.  Patented Apr. 28, 1914.

Application filed December 23, 1912. Serial No. 738,283.

*To all whom it may concern:*

Be it known that we, JOHN SELLERS BANCROFT and MAURITZ C. INDAHL, of Philadelphia, in the county of Philadelphia and State of Pennsylvania, have invented certain new and useful Improvements in Centering or Adjusting Mechanisms for Type-Machines; and we do hereby declare the following to be a full, clear, and exact description of the same, reference being had to the accompanying drawings, forming a part of this specification, and to the figures and letters of reference marked thereon.

This invention relates to what are sometimes denominated point to point centering or positioning systems characterized by this that the member operated upon is translated or adjusted directly from one to any other of a series of indicated positions or stations without returning to an initial or zero point from whence the stations are measured, and it is specially designed for application to the die case and mold adjusting devices of automatic type casting and composing machines wherein the various movements for position or adjustment are controlled through signals contained in a record strip or controller.

Specifically the invention constitutes an improvement upon that more broadly claimed in our application Serial No. 709,468, filed July 15, 1912, and has for its primary objects increased efficiency and greater capacity.

To these ends the invention consists in the construction, combination and arrangements of parts hereinafter fully described, the novel features being specified in the appended claims.

In the accompanying drawings illustrating a preferred form of embodiment of the invention—Figure 1 is a top plan view of a portion of a type casting and composing machine with the improvements applied thereto. Fig. 2 is a perspective view of the two centering mechanisms. Fig. 3 is a perspective of the movable gaging unit and actuating devices together with the contacting members of one jaw. Fig. 4 is a perspective of the movable gaging unit detached. Fig. 5 is a side elevation of the gaging mechanism. Fig. 6 is a longitudinal horizontal section through the parts represented in Fig. 5. Fig. 7 is a transverse vertical section on line $x$—$x$, of Fig. 6. Fig. 8 is a side elevation of the gaging mechanism. Fig. 9 is an end view of the stationary gaging unit. Fig. 10 is an end view of the section of the stationary gaging unit containing the first of the series of gages. Fig. 11 is a similar view of the second gage. Fig. 12 is a similar view of the third gage. Fig. 13 is a similar view of the fourth gage. Figs. 14 to 22 inclusive are diagrammatic views of the gaging units and jaws in different positions of adjustment. Fig. 23 is a diagrammatic view of the actuating mechanism for the movable gaging unit. Figs. 24 to 27 inclusive are similar views of the actuating mechanism in different positions of adjustment.

Like letters of reference in the several figures indicate the same parts.

The invention is illustrated in its application to the type casting and composing machine of Patent No. 625,998, dated May 30, 1899, as improved in minor particulars not necessary to be mentioned here inasmuch as they do not directly affect the matter under consideration. It will suffice for purposes of identification to refer to some of the principal elements of the prior patented machine, such as the die case 1 and its carrier 2; the centering pin 3; the mold blade actuating lever 4 and the type carrier 5. The paper tower, metal injecting mechanism, mold and galley mechanism, are not shown as their relation to the present invention is indirect.

The centering or positioning mechanism constitutes the medium through which the signals of the record strip are translated into movements of adjustment with respect to the die-case, its carrier, and the mold adjusting devices, whereby these parts are moved directly from one indicated position to another.

In the machine of Patent No. 625,998, each centering mechanism (of which at least two were employed, one for the die case and the other for its carrier) included two gaging and two positioning factors, and according to application Serial No. 709,468, these were reduced to a single gaging and a single positioning mechanism. The present invention pertains to the last named system, in that it effects the point to point movements of adjustment by means of a single signal-responsive gaging means and a single positioning mechanism, the latter represented by oppositely movable jaws closing upon said gage and upon translating devices coupled with the performing member (die-case, carrier or mold adjusting devices) and it differs therefrom in this that it embodies an additional signal responsive means or element whereby the number of available stations is materially increased.

In the present instance, as heretofore, two positioning mechanisms are employed, one for the die case and the other for its carrier and the mold adjusting devices. They are substantially duplicates save in one particular, and that is, one is provided with extensions 6 for engaging the mold adjusting devices. As a further preliminary it may be stated that in the preferred form of embodiment illustrated the gaging and contacting elements of each set are duplicated and symmetrically disposed on opposite sides of their supporting guides, to balance their action and prevent binding. It will suffice, therefore, in the following detailed description, to refer to one set of gages and contacting surfaces, corresponding members of the duplicate set being designated by the same reference numeral and distinguished by the exponent "$a$" applied to the duplicate. Each positioning mechanism includes oppositely movable jaws, 7, 8, guided to reciprocate in the same plane, as upon alined hollow sectional guides 9, 10, and each connected, as by a head or collar 11 or 12 with one member of a pair of floating tongs 13, corresponding to those of the secondary positioning mechanism of the prior patent referred to. Each jaw (7, 8) is provided with three engaging or contacting surfaces 14, 15, 16, or $14^a$, $15^a$, $16^a$, in fixed relation one to the other with two of said surfaces 15, 16, $15^a$, $16^a$, located in different planes and spaced longitudinally of the path of the jaws by an amount equal or proportional to the unit of the scale adopted. The contact surfaces of each set 14, and $14^a$, 15 and $15^a$, and 16 and $16^a$, are in alinement and opposed.

Located intermediate jaws 7, 8 is a duplex gaging mechanism compounded of two stepped gaging units or members one of which is coupled with the performing member and is free to move longitudinally of the path of the jaws and is also movable, for adjustment, transversely of said path, while the other is held against displacement in the direction of motion of the jaws but is adjustable transversely thereof. In the present instance the last named or what may be termed the stationary gaging unit takes the form of a cylinder 22 mounted to rotate in bearings 23 on the frame and provided with a series of gaging members 24 (in the example four) of the same linear dimensions, arranged in sequence and displaced laterally one from another in a uniform degree. Preferably the cylinder is constructed in sections each containing one gaging member, and, as shown, the displacement of succeeding gages equals eight units, that is, eight times the displacement of surfaces 15, 16. The gaging members 24 are mounted for successive interposition between the opposed surfaces 15, $15^a$ and 16, $16^a$, of the jaws, to determine the closed positions of the latter, the arrangement being such that if the first of the series of gaging members 24 is located between one set of opposed surfaces 15, $15^a$ (see Figs. 14, 16, 18 and 20) the closed position of the jaws will be at one point, and if located between the other set of surfaces 16, $16^a$ (see Figs. 15, 17, 19 and 21) said closed position will be removed from the first position by an amount corresponding with the displacement of said surfaces, that is one unit. So too, if the cylinder is shifted to present the second gage 24 between the jaws (see Fig. 22) the closed position upon engagement of the same opposed surfaces 15, $15^a$, will be eight units removed from the first position, for the third gage, sixteen units, and for the fourth gage twenty four units. It will, therefore, be seen that by means of this stationary gaging unit the closed position of the jaws, that is the position assumed when a gaging member 24 is clamped between the jaws, may be selectively established at any one of eight stations or divisions of the scale, to wit, in the first, second, ninth, tenth, seventeenth, eighteenth, twenty fifth, or twenty sixth divisions. The six spaces or divisions of the scale included in the intervals between successive gages 24 are covered or supplied by the second or movable unit of the duplex gaging mechanism. This member is also preferably in the form of a cylinder 25 located within cylinder 22 and provided with a series of stepped gages 26 of uniform linear dimensions adapted for successive interposition in the path of opposed contact surfaces 14, $14^a$. The displacement or pitch of gages 26 is in units, in the present instance, two units of the scale, and the cylinder 25 bearing them is rotatively coupled with the performing member (die case or its carrier). In the example illustrated, gage cylinder 25 is detachably secured to a sleeve 27 mounted to turn upon a rod 28, the latter coupled with the performing member. Sleeve 27 is furnished with a key 29 engaging internal grooves in a sleeve 30 the latter mounted in suitable bearings in guide 10. As thus arranged cylinder 25 is supported against longitudinal displacement upon but is free to rotate about the translating member or rod 28; and said cylinder and rod are free to reciprocate longitudinally in guide 10 both with respect to stationary gaging unit 22 and the adjustment transmitting member 30.

Simultaneously with the closing of the jaws upon the stationary gaging unit 22 in any of its eight positions of adjustment one or the other gage 26 of the movable gaging unit will be engaged between surfaces 14, 14ᵃ, of said jaws, thereby establishing the relation of the performing member to the indicated closed position of the jaws. It is obvious that the position of the performing member as thus determined will depend upon the longitudinal position of the gage 26 at the time located between engaging surfaces 14, 14ᵃ, and when, as in the example given, the ratio of displacement of gages 26 is two units, it follows that the presentation of successive gages in the path of surfaces 14, 14ᵃ, will each effect a two unit displacement of the performing member in its relation to the indicated closed position of the jaws. Thus with the first of the series of gages 26 in line with surfaces 14, 14ᵃ, of the jaws a fixed and definite relation is established between the jaws and performing member such that when said jaws are closed in any of the eight positions determined by stationary unit 22 the performing member will be correspondingly located. If the movable gaging unit 25 is now shifted to present the second gage 26 a displacement of two units in the position of the performing member will result; if the third gage 26 is presented the shift will be four units; and if the fourth gage 26 is presented the shift will be six units. It follows from this that the first gage 24 acting in conjunction with the first or upper surfaces 15, 15ᵃ, and with the surfaces 14, 14ᵃ, opposite the first gage 26, will bring the performing member to the first position in the series, as illustrated diagrammatically in Fig. 14. The same gages acting in conjunction with the lower set of contacts 16, 16ᵃ, Fig. 15, will establish the performing member in the second position or one unit distant from the first. If, however, the second gage 26 is brought into conjunction with the first gage 24 and upper contacts 15, 15ᵃ, Fig. 16, the performing member will be displaced two units from the position first described and will be located in the third position on the scale. A shift of first gage 24 to lower contacts 16, 16ᵃ, Fig. 17, will add another unit of displacement, bringing the performing member to the fourth division. Shifting first gage 24 back to first position opposite upper contacts 15, 15ᵃ, Fig. 18, and advancing the third gage 26 into operative position between contacts 14, 14ᵃ, the four unit displacement of the performing member effected thereby brings it to the fifth position, and this is changed to the sixth by a movement of first gage 24 into alinement with lower contacts 16, 16ᵃ, Fig. 19. The seventh and eighth positions on the scale are produced by advancing the fourth gage 26 into operative position and adjusting first gage 24 in relation to the two sets of contacts 15, 15ᵃ and 16, 16ᵃ, as illustrated in Figs. 20, 21. In like manner the ninth and tenth, seventeenth and eighteenth, twenty-fifth and twenty-sixth positions are attained respectively by the second, third, and fourth gages 24, acting in conjunction with the first gage 26, and the intermediate positions by the interchange of the second, third and fourth gages 26 and shifting of gages 24 with respect to the two sets of contacts 15, 15ᵃ and 16, 16ᵃ, as fully explained in connection with the first gage 24 and series of gages 26.

From the foregoing it will be seen that each gaging unit 22, 25, controls as many positions as it has gages 24, or 26, in the present instance four each with capacity of sixteen stations, and, further, that by the addition of the third gaging member, represented by the two sets of special contacts 16 and 16ᵃ, the capacity of gaging units 22, 25, is multiplied by the number of said sets of contacts, giving in the present instance, a measure of thirty two equal divisions, each of the latter susceptible of designation through the conjoint action of the three gaging members. It will be observed that the number of stations thus provided is more than twice the capacity of the centering mechanism of Patent No. 625,998, and if applied in the same way would require either smaller matrices or an increase in the size of the die-case. This is not, however, the special purpose for which the invention is here applied. This centering mechanism is designed for use in connection with matrices whose dimensions as compared with normal matrices are fractionally increased in either or both directions, and to deal with die cases of standard dimensions equipped in whole or in part with either normal or fractionally enlarged matrices. As is well known commercial machines according to Patent 625,998, are organized to deal only with matrices of standard dimensions ($\tfrac{2}{10}$ in. square), hence the unit of the signal controlled gaging devices is fixed at $\tfrac{2}{10}$ in. This permits the designation, through the signal controlled gaging devices, of any one of the fifteen stations, included in the scale or measure adopted. The standard matrix is of suitable dimensions for the most used sizes of type, but it is too small for the larger sizes, hence it has been proposed to increase the size of the matrix. But this can only be done in units of the matrix without change or interference with the standard centering mechanism. For some of the larger type a fractional increase in the size of the matrix in either or both directions will suffice to accommodate the characters, and the present arrangement is one competent to deal with a die case of standard dimensions equipped with either or both standard or fractionally enlarged matrices. The unit of increase proposed is $\frac{1}{10}$ in. and accordingly the displacement of engaging surfaces 15 and 16 (15ª and 16ª) is set at or proportional to that measure, the normal or standard divisions of the measure being designated through adjustments of gaging units 22, 25, and the fractional or unitary displacement by the interchange of gaging surfaces 15, 16.

It remains to describe how the adjustments of the several gaging members are produced and controlled through the medium of the record strip.

A preferred form of adjusting mechanism is illustrated in Figs. 23 to 27 inclusive, one specially designed for control through a limited number of signal responsive components or members but not necessarily limited thereto as other forms may be employed. The stationary gaging unit or member 22 is furnished with teeth meshing into those of a rack 32, the latter movable in guides on the frame and normally held in retracted position by yielding means, such as a spring 33, suitably coupled therewith. In this position the first of the series of gages 24 rests between the jaws in alinement with contacts 15, 15ª, Figs. 5 and 15. To rack 32 is pivotally connected a lever 34 (Fig. 23) one arm whereof rests upon a roller carried by the piston rod 35 of a motor 36, while the other arm rests upon a roller carried by a block or head 37 movable in guides 38. To head 37 is pivotally connected a lever 39 one arm whereof rests upon a roller carried by the piston rod 40 of a motor 41 and the other arm upon a like roller carried by the piston rod 42 of a motor 43. The levers and motors are so proportioned, arranged and connected that when the motors are deënergized or at rest, as represented in Fig. 23, cylinder 22 will be arrested with the first of the series of gages 24 in alinement with one set of contacts 15, 15ª, when motor 41 is energized, as by the admission of pressure below its piston, lever 39 will be tilted to advance rack 32 one degree (Fig. 24) or an amount equal to the distance between the centers of the first and second gages 24, thus locating said second gage 24 between contacts 15, 15ª as indicated in Fig. 22; a like movement of motor 43, acting alone, will advance cylinder 22 two degrees (Fig. 25) or the distance between the centers of the first and third gages 24, bringing said third gage into position; while both motors acting together (Fig. 26) will advance the cylinder three degrees or the distance between the centers of the first and fourth gages 24, thus bringing the fourth gage into position between the jaws. The adjustments described are adequate for effecting a selective presentation of the gages 24 between the same set of contacts 15, 15ª or 16, 16ª, but are incapable of discriminating between the two sets of contacts so that the engagement may be by either set. This discriminating function is alloted to motor 36 which when energized has the effect of extending the connection between lever 39 and the rack by an amount equal to lateral displacement of the associated contacts 15, 16, or 15ª, 16ª, or one half the unit on the scale of motion controlled by motors 41, 43, so that by energizing motor 36 alone or in conjunction with one or both motors 41, 43, a displacement of the selected gage 24 will be effected and the latter will be shifted from a position opposite contacts 15, 15ª, to one in alinement with contacts 16, 16ª. For example, assuming motors 41, 43, to be deënergized, as indicated in Fig. 23, so that the first of the series of gages 24 lies between the jaws, if at the time motor 36 is also deënergized the selected gage will stand opposite contacts 15, 15ª, as indicated in Fig. 14; but if motor 36 is energized the selected gage will be shifted into alinement with contacts 16, 16ª, as indicated in Fig. 15. A corresponding displacement of the selected gage 24 will be effected each time motor 36 is energized in conjunction with either or both motors 41, 43, the latter operating to locate the corresponding gage between the jaws and motor 36 to selectively position the positioned gage opposite one or the other sets of contacts 15, 15ª or 16, 16ª. Thus through the agency of three signal responsive elements or devices corresponding to motors 36, 41, and 43, any one of eight positions may be designated for the gaging unit 22, the first or initial position being designated by an absence of signal perforations pertaining to any of the motors. The movable gaging unit 25 is controlled by an adjusting means applied to sleeve 30 and includes an actuating rack 45 coupled to a two to one lever 46, the opposite ends whereof are engaged by the piston rods of motors 47, 48, respectively. The strokes of the two motors 47, 48, are equal and proportional to three degrees of motion of cylinder 25 measured in units of the displacement of successive gages 26 thereon. The arrangement is such that the piston rod of motor 47 when operated advances cylinder 25 one degree or sufficient to locate the second gage 26 between contacts 14, 14ª of the jaws; the piston rod of motor 48 effects a two degree advance of the cylinder presenting the third of the series of gages 26; and both motors 47, 48, acting together effect a three degree movement of the cylinder and the presentation of the fourth gage 26. The cylinders of the several motors 36, 41, 43, 47 and 48, are separately connected to a corresponding number of ports in the tracker bar, and the signals designating any of the thirty two divisions of the scale of measurement thus provided operate to admit pressure to such of the motor devices as singly or in combination represent the desired sub-division.

It is obvious that when the die case is equipped with standard or $\frac{2}{10}$ matrices the various positions of adjustment in each direction can be effected through combinations of the four signal perforations controlling motors 41, 43, 47 and 48, acting upon the stationary and movable gaging units with relation to contacts 14, 14ª, and one set of contacts 15, 15ª or 16, 16ª; and it is only when the fractional adjustments are required, as when the die-case contains one or more matrices of abnormal dimensions, that motor 36 is brought into action to add a unit of the measure which latter, in this case, is one half the unit of the measure required for normal matrices.

Having thus described our invention, what we claim as new is:

1. In a type casting and composing machine provided with a movable die-case and oppositely movable positioning jaws and in combination with the latter a duplex gaging mechanism for varying the closed positions of the jaws and the relation of the die case thereto, the same including a stationary gaging unit equipped with a series of stepped gages and movable laterally of the line of travel of the jaws to present individual gages between and in alinement with said jaws, and a movable gaging unit coupled with the die case and provided with a stepped series of gages movable between and transversely of the line of travel of the jaws.

2. In a type casting and composing machine provided with a die case and a carrier therefor movable relatively to one another on intersecting lines, and in combination therewith, a centering or adjusting mechanism for said die case and carrier, the same including two pairs of oppositely moving positioning members or jaws and duplex gaging mechanism for each pair of jaws provided with signal controlled stationary and movable stepped gaging units interposed between and adjustable transversely of the line of movement of said jaws, the movable unit of one gaging mechanism being coupled with the die case and that of the other with the carrier.

3. A point to point centering or adjusting mechanism for type casting and other machines the same comprising, in combination, oppositely movable positioning jaws and a duplex gaging device interposed between said jaws and including two stepped gaging units, one stationary and the other movable with respect to the line of travel of the jaws and each separately adjustable in a direction transverse to said line of travel.

4. In a point to point centering or adjusting mechanism such as described, provided with oppositely movable positioning jaws adapted to close at any intermediate position in their approaching movement, and in combination therewith, a duplex gaging means interposed between said jaws the same including a stepped gage movable transversely of the jaws to selectively interpose individual gaging members or sections between the jaws for determining different closed positions of the latter, and a second stepped gage movable in two directions the one for adjustment to bring individual gaging members or sections between the jaws, and the other in line with the motion of the jaws, to position said gage and its connected performing member in accordance with the setting of the two gages.

5. In a point to point centering or adjusting mechanism such as described, the combination of the following elements, to wit, oppositely movable positioning jaws; an adjustable or performing member; a duplex gaging means interposed between and adapted to be engaged by said jaws during their closing movements, the same including a gaging member movable transversely of the path of the jaws for arresting the latter at different points in their line of travel and a gaging member coupled with the aforesaid adjustable or performing member and movable both transversely of and parallel with the jaws; and means for selectively adjusting said gaging members.

6. In a point to point centering or adjusting mechanism such as described, the combination of the following elements to wit; oppositely movable positioning jaws; an adjustable or performing member; a duplex gaging means interposed between the jaws in position to be engaged thereby during their closing movement, the same including a stepped gaging member movable transversely of the line of travel of the jaws to bring individual gaging members in alinement therewith, and a second stepped gaging member movable in two directions the one parallel with and the other transverse of the line of motion of the jaws; and signal controlled adjusting means for positioning said stepped gaging members.

7. In a point to point centering or adjusting mechanism such as described, the combination of the following elements, to wit; oppositely movable positioning jaws provided with a plurality of spaced contacts; means for gaging the closed position of said jaws including a stepped gaging member interposed between and movable laterally of the line of movement of said jaws, to bring its several gaging members separately into alinement with either of the jaw contacts; and means for adjusting said gaging member.

8. In a point to point centering or adjusting mechanism, such as described, the combination of the following elements, to wit; oppositely movable positioning jaws provided with stepped contacts; and a duplex gaging means located between said jaws and including a stepped gaging unit movable transversely of the line of travel of the jaws, and a second stepped gaging unit movable both longitudinally and laterally of the line of travel of said jaws; and means for effecting and controlling the movements of said gaging units.

9. A point to point centering or adjusting mechanism such as described comprising, in combination, oppositely movable positioning jaws equipped with stepped contact surfaces, and a duplex gaging device interposed between said jaws and equipped with two stepped gaging units individually adjustable in a direction transverse to the line of travel of the jaws, one of said units being movable in the line of travel of said jaws.

10. In a point to point centering or adjusting mechanism, such as described, the combination of the following elements, to wit; a pair of oppositely movable positioning jaws provided with three complemental contacts of which two are stepped in the line of movement of said jaws; and a duplex gaging mechanism including a stepped gaging unit movable transversely of the line of travel of the jaws between and in the plane of movement of their stepped contacts, and a second stepped gaging unit located between opposing contact surfaces on the jaws, and movable both longitudinally and laterally of the path of the jaws.

11. In a point to point centering or adjusting mechanism such as described, the combination of the following elements, to wit; oppositely movable positioning jaws provided with two sets of opposing contacts in different planes; a stepped gaging member movable transversely of the line of travel of the jaws between one set of contacts thereon; and a second stepped gaging member supported to reciprocate longitudinally of the line of travel of the jaws and movable laterally thereof between the other set of contact surfaces.

12. In a point to point centering or adjusting mechanism such as described, the combination of oppositely movable positioning jaws equipped with three sets of opposed contacts whereof two sets are stepped or spaced in the direction of motion of the jaws; and a duplex gaging mechanism interposed between said jaws and including a fixed stepped gaging unit adjustable laterally of the line of travel of the jaws in the plane of the stepped or spaced contacts thereon, and a second or movable stepped gaging unit interposed between the remaining set of jaw contacts and movable both longitudinally and laterally of the path traveled by the jaws.

13. In a point to point centering or adjusting mechanism such as described, the combination of the following elements, to wit; oppositely movable positioning jaws each provided with three contact surfaces of which two are relatively stepped or displaced in the line of movement of said jaws; and a duplex gaging mechanism, the same including a movable gaging unit in the form of an axially movable and revoluble cylinder provided with a circumferential series of gaging members the latter movable between and in the plane of motion of one set of opposing contact surfaces of the jaws; and a stationary gaging unit in the form of a hollow revoluble cylinder provided with a series of stepped gaging members the latter movable across the paths of the stepped contacts of the jaws.

14. In a point to point centering or adjusting mechanism such as described, the combination with a pair of oppositely movable positioning jaws each provided with three contact surfaces two of which are in the same plane and stepped, and a duplex gaging device including two cylindrical stepped gaging units the one stationary and the other movable in the line of travel of the jaws, one of said gaging units being located axially within the other and each separately revoluble about a common axis, to present its stepped gaging members in position, the one between one set of jaw contacts and the other successively between the two pairs of stepped jaw contacts.

15. In a point to point centering or adjusting mechanism such as described, the combination with a pair of oppositely movable positioning jaws each provided with two sets of opposed contacts, of a duplex gaging device including stationary and movable stepped gaging units each interposed between a separate set of opposed jaw contacts and movable for adjustment transversely of the lines of travel of said contacts, and separate adjusting means including signal responsive devices for each gaging unit.

16. In a point to point centering or adjusting mechanism such as described, the combination of the following elements, to wit; a pair of oppositely movable positioning jaws provided with two sets of opposing contacts in different planes and a duplex gaging device provided with stationary and movable gaging units, one for each set of opposing contacts and adjustable transversely of the line of movement of the latter, one of said gaging units consisting of a plurality of stepped gaging members circumferentially disposed about a revoluble cylinder, and the other gaging unit consisting of a stepped series of gaging members disposed within a revoluble cylinder surrounding the first named cylinder.

17. In a point to point centering or adjusting mechanism such as described, the combination of the following elements, to wit; oppositely movable positioning jaws each furnished with three contacts whereof two are stepped or located at relatively different points in the line of motion of the jaws; a revoluble hollow cylinder provided with an internal series of stepped gaging members arranged for successive interposition in the line of movement of either stepped jaw contact; a revoluble and axially movable cylinder or head provided with a circumferential series of stepped gaging members arranged for successive presentation between opposed jaw contacts; and adjusting devices connected with said cylinders for selectively presenting individual gaging members of the two series between opposed contacts on the jaws.

18. In a point to point centering or adjusting mechanism such as described, the combination with oppositely movable positioning jaws and an interposed gaging device provided with a gaging unit including a series of stepped gages interposed between said jaws and movable laterally with respect to their line of motion, to present individual gaging members in alinement with opposing contact surfaces on the jaws, of signal controlled actuating devices for said gaging unit the same including a lever coupled with said gaging unit and two motors each coupled with one arm of the lever and acting separately and in conjunction to effect different degrees of movement of said gaging unit.

19. In a point to point centering or adjusting mechanism such as described provided with oppositely movable positioning jaws equipped with stepped contacts and in combination therewith, a stepped gaging unit located between and movable transversely of the line of travel of said jaws, and actuating devices for positioning said gaging unit to present any one of its gaging members in line with either set of stepped contacts on the jaws, the same including a lever coupled with said gaging member and having its fulcrum coupled with a signal controlled motor device and its power end coupled with a second lever the two arms whereof are engaged by separate signal controlled motor devices.

20. In a point to point centering or adjusting mechanism such as described, the combination of the following elements, to wit; oppositely movable positioning jaws provided with three sets of contacts two of which are stepped; a duplex gaging mechanism including a stationary gaging unit provided with a series of stepped gages and movable transversely of the line of travel of the jaws to present individual gages in between and in alinement with either set of stepped contacts on said jaws and a movable gaging unit provided with a series of stepped gages movable transversely of the line of travel of jaws to present individual gages between and in alinement with a third set of contacts on said jaws; and signal controlled actuating or adjusting mechanism for said gaging mechanism the same including a lever coupled with the movable gaging unit and supported at each end by a motor, and a lever coupled with the other gaging unit, a motor supporting the fulcrum end of said lever, a second lever connected with the power end of said last named lever and two motors each connected to one arm of said second lever.

JOHN SELLERS BANCROFT.
MAURITZ C. INDAHL.

Witnesses:
MORTIMER A. JONES,
SAMUEL A. FRASER.